Dec. 6, 1927.
M. B. COOKE
1,651,513
REFRIGERATION
Filed April 10, 1926
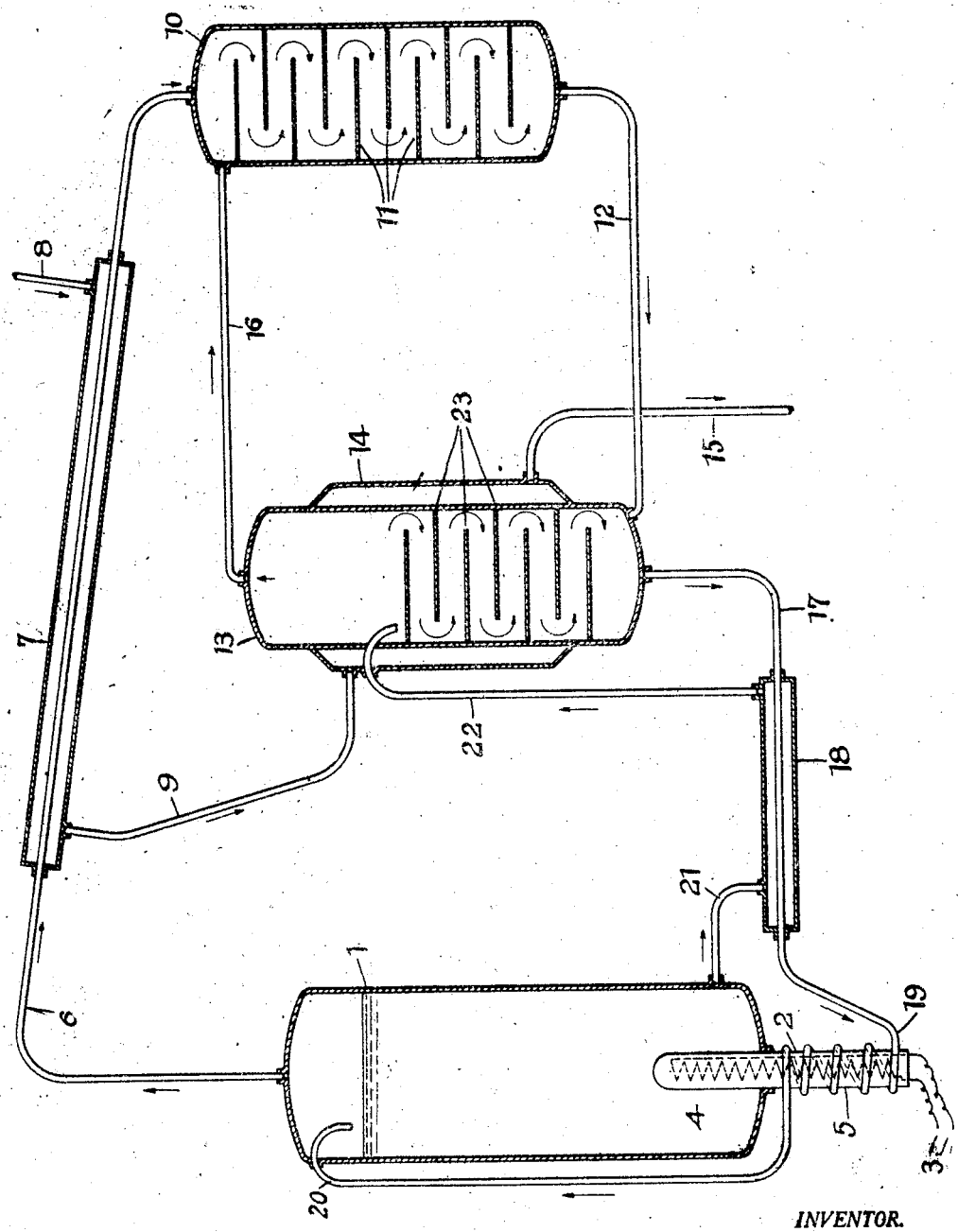
INVENTOR.
MAURICE B. COOKE.
BY
Sheffield Betts
HIS ATTORNEYS.

Patented Dec. 6, 1927.

1,651,513

UNITED STATES PATENT OFFICE.

MAURICE B. COOKE, OF PLAINFIELD, NEW JERSEY, ASSIGNOR TO THE M. W. KELLOGG COMPANY, A CORPORATION OF DELAWARE.

REFRIGERATION.

Application filed April 10, 1926. Serial No. 101,145.

This invention relates to improvements in refrigeration systems, particularly those of the type wherein the refrigerant gas used such as ammonia is separated from the refrigerant solvent, preferably water, by distillation, condensed into liquid form, led into an inert gas in an expansion or refrigeration chamber, reabsorbed in the solvent in liquid form and passed once more to the distillation apparatus for recycling. Due to the law of vapor pressures it is inevitable that some of the solvent be carried over either by distillation or mechanical entrainment to the condensation and refrigeration portions of the apparatus.

A great difficulty in systems of this description has been to render such a system capable of continuous operation without interruption due to the presence of the solvent contained in the gas being expanded.

My invention contemplates adding a distillable refrigerant solvent freezing temperature lowering reagent with the solvent, preferably one having a lower boiling point than that of the solvent so that owing to the law of vapor pressures a sufficient amount of the distillable refrigerant solvent freezing temperature lowering reagent will be carried over with whatever solvent is carried over into the refrigeration chamber and condensed therein to liquid form to prevent said then liquid refrigerant solvent from freezing during the refrigeration caused by the expansion of the refrigerant, and returned with the distilled solvent and the refrigerant later reabsorbed therein to the still for recycling. An object of my invention therefore is to make a refrigerating machine of this type incapable of freezing during the expansion of the refrigerant by the introduction into the circulating refrigerant and refrigerant solvent of a distillable liquid substance which will lower the freezing point of the solvent to such an extent that the solvent will not freeze under the conditions of temperature and pressure at which the expansion of the gas takes place.

In refrigerating apparatus of the absorption type, it has heretofore been proposed to use ammonia as the expansible gas, said ammonia being absorbed in water from which it is evaporated and condensed into liquid form, then introduced to the expansion chamber where it is mixed with a suitable gas such as hydrogen and allowed to expand to produce the desired degree of refrigeration. The hydrogen or similar gas is then separated from the expanded ammonia in a suitable chamber where the ammonia is absorbed by the water and returned to the generator for further circulation. However, in this type of apparatus the presence of water vapors in the liquefied ammonia issuing from the condenser causes the apparatus to become inoperative unless special means are provided for preventing the clogging of the passages by the particles of frozen water which accumulate because of the reduced temperature in the expansion chamber. According to this invention it has been found that the addition of substances which lower the freezing point of the solvent in which the refrigerant is absorbed will prevent the formation of particles of the frozen solvent, such as water, and will overcome a tendency to clog the apparatus, as pointed out. One example of a refrigerant solvent temperature lowering reagent to be added to the gas carrying solvent preferably in the generator of the refrigerating device and which has been found to be especially efficacious is ethyl alcohol. This may be added to the solvent in any part of the system, preferably in the generator, preferably in an amount comprising from 2 to 10% of the aqueous ammonia contained therein. Owing to the effect of the respective vapor pressures of ammonia, water and alcohol, this proportion of alcohol added to the solution will produce a vapor primarily of ammonia, mixed with a small amount of vapor consisting of approximately 50% water and 50% alcohol. Although a relatively small portion of alcohol be added it is well known that a larger amount of the lower boiling constituent will exist in the vapor, be condensed and passed to the expansion chamber than existed in the liquid in the still. Obviously other alcohols may be used and other substances such as glycerine may be employed. Although glycerine has a higher boiling point than that of water steam distillation is a common method of purifying glycerine and although it has a much higher boiling point than water sufficient will be carried over to prevent freezing of the water during the expansion step. Poly-hydric alcohols, such as dihydric ethylene glycol may be employed in place of monohydric alcohols, such as ethyl alcohol or methyl alcohol with satisfactory results, all of which are soluble in water. As is well known there is a large variety of other liquids which will emit vapors or be mechanically entrained in the presence of water even if the temperature is not raised above that of boiling water.

One instance of the utilization of this invention is illustrated in the accompanying drawing forming a part of this specification, in which the figure shown is a schematic diagram of the various elements of the apparatus and their pipe connections. In this drawing the numeral 1 indicates a combination boiler or generator. This is heated in any preferable way, such as by the electrical heating element 2 having leads 3 connected with a suitable source of electricity, such as the usual house lighting mains. As indicated in the figure, this heating element has a portion 4 extending into the boiler and a portion 5 outside the boiler, the purpose of which will be referred to hereafter. From the top of the boiler or generator 1 a pipe 6 extends through a condenser 7, which is furnished with cooling water or other cooling medium through the pipe 8 and from which condenser the cooling medium is discharged by the pipe 9. The pipe 6 connects with the upper portion of an evaporator 10 which is preferably provided with internal baffles 11. The numeral 12 indicates a discharge pipe from the evaporator 10 which passes into the lower portion of an absorber 13. This absorber is provided with a jacket 14 for containing a suitable cooling medium, such as water, and is preferably connected with the condenser 7 through the pipe 9 as indicated. The jacket 14 is provided with a discharge pipe 15. The top of the absorber 13 is connected with the evaporator 10 by means of a pipe 16. A pipe 17 extends from the bottom of the absorber 13 through a chamber 18, which acts as a heat interchanger to supply heat from the fluid contained therein to the pipe 17 which is continued as indicated at 19 and wound helically about the heating element 5, from which it passes into the upper portion of the generator 1 above the level of the liquid therein, as indicated at 20. The heat interchanging chamber 18 is connected with the lower portion of the generator 1 by a pipe 21 and with the upper portion of the absorber 13 by a pipe 22. The absorber 13 is preferably provided with baffles as indicated at 23.

The generator 1 is partially filled with aqueous ammonia containing 2 to 10 per cent of alcohol or similar substance as above mentioned, up to about the level indicated and the absorber 14 and the remaining space above said level in the system is filled with hydrogen or other suitable gas such as helium, and ammonia under a pressure of several atmospheres. Water or other suitable cooling medium passes through the pipe 8 into the condenser 7 through the pipe 9 into the jacket 14 and is discharged through the pipe 15. The operation of this form of apparatus may be described as follows: Heat being produced by the heating element 4 within the generator 1 the aqueous ammonia and alcohol is heated to such a point that the ammonia is driven off through the pipe 6, together with a slight amount of water vapor containing alcohol in solution as above pointed out. The ammonia and water vapor passes through the condenser 7 where the ammonia, water and alcohol vapors are liquefied and drop into the evaporator 10. Assuming the pressure in the generator 1 and in the absorber 13 to be about 150 pounds, the total effective pressure in the evaporator 10 will also be 150 pounds, but this pressure will be composed of two independent vapor pressures of say 40 pounds and 110 pounds, that is to say, the pressure of the ammonia gas will be 40 pounds and the pressure of the hydrogen gas will be 110 pounds. Thus the ammonia will immediately expand and absorb the heat from the space surrounding the chamber 10, thereby producing refrigeration.

Owing to the fact that the water vapor contained in the ammonia introduced at the top of the evaporator 10 has been provided with alcohol or a similar substance for reducing the freezing point, the water vapor contained in the ammonia will not freeze and will be discharged to the bottom of the chamber 10 in liquid form, thereby keeping the system at all times free from obstruction or interruption. The mixture of ammonia gas, hydrogen and water vapor will be discharged from the evaporator 10 through the pipe 12 into the absorber 13. It is here met by a spray of water, containing ammonia to a slight amount, which is supplied through the pipe 22 from the generator 1 through the heat interchanger 18. This water which flows by gravity from the generator to the absorber readily absorbs the major portion of the ammonia gas previously introduced therein and also the entrained alcohol and water. The inert gas or hydrogen is thus stripped of the ammonia and thereafter assumes the total pressure in the upper part of the absorber which has been indicated as 150 pounds more or less according to the preferred pressure employed. The released light hydrogen gas rises by virtue of its lighter weight and thereafter is discharged through the pipe 16 into the evaporator where it is again mixed with ammonia gas and discharged through the pipe 12, thus completing its cycle in the apparatus. The discharge of the strong absorption liquid or aqueous ammonia from the bottom of the absorber 13 into the generator 1 is facilitated by the use of the thermosiphon principle which may be applied as indicated by using a helical coil 19 as a part of the pipe 17 about the heater 5. The strong aqueous ammonia is then discharged into the generator 1 through the end 20 of the supply pipe, thus completing the cycle of the circulating and refrigerating medium in the system.

From the above description it will be apparent that difficulties in the use of circulating mediums in various processes where cooling by evaporation and expansion are employed have been obviated and in the type of absorption refrigerating apparatus described the difficulties arising from the freezing of water vapors have been entirely overcome without the addition of valves, pumps or other complicated, delicate or bulky apparatus.

Although in the specific example shown I have described ammonia as the solvent and alcohol as the refrigerant solvent temperature lowering reagent it is obvious that other equivalent materials may be substituted therefor. In the claims I employ the words "carried over" or "distilled" to include either actually distilled or mechanically entrained with a distilled vapor.

Having thus described this form of the invention, what is claimed and desired to protect by Letters Patent is as follows:

1. The herein described improved step of preventing freezing of a distillable liquid refrigerant solvent in the refrigeration step of a distillation refrigeration process which comprises adding a distillable refrigerant solvent freezing temperature lowering reagent having a lower boiling point than that of the solvent to the refrigerant solvent whereby enough of said refrigerant solvent freezing temperature lowering reagent may be carried over with whatever solvent is carried over to the refrigeration chamber and condensed therewith to liquid form to prevent said then liquid refrigerant solvent from freezing during the refrigeration caused by the expansion of the refrigerant and returned with the distilled solvent and the refrigerant later reabsorbed therein to the still for recycling.

2. The herein described improved step of preventing freezing of a distillable liquid refrigerant solvent in the refrigeration step of a distillation refrigeration process which comprises adding a distillable refrigerant solvent freezing temperature lowering reagent to the refrigerant and refrigerant solvent whereby enough of said refrigerant solvent freezing temperature lowering reagent may be carried over with whatever solvent is carried over to the refrigeration chamber and condensed therewith to liquid form to prevent said then liquid refrigerant solvent from freezing during the refrigeration caused by the expansion of the refrigerant and returned with the distilled solvent and the refrigerant later reabsorbed therein to the still for recycling.

3. The herein described improved step in a distillation refrigeration process which comprises adding and cycling a sufficient quantity of a distillable refrigerant solvent freezing temperature lowering reagent with the refrigerant and whatever solvent may be carried over through the distillation, condensation, refrigeration and absorption steps thereof to prevent freezing of the then liquid refrigerant solvent during the refrigeration step.

4. The herein described improved step for preventing freezing of water in the refrigeration step of a distillation refrigeration process which comprises adding alcohol to the ammonia and water whereby enough of said alcohol may be carried over with whatever water is carried over to the refrigeration chamber and condensed therewith in liquid form to prevent said then liquid water from freezing during the refrigeration caused by the expansion of the ammonia and returned with the distilled water and the ammonia later reabsorbed therein to the still for recycling.

5. The herein described improved step in a distillation refrigeration process which comprises adding and cycling a sufficient quantity of alcohol with ammonia and whatever water may be carried over through the distillation, condensation, refrigeration and absorption steps thereof to prevent freezing of the said then liquid water during the refrigeration step.

MAURICE B. COOKE.